United States Patent
Kato et al.

(10) Patent No.: US 8,029,058 B2
(45) Date of Patent: Oct. 4, 2011

(54) VEHICLE SEAT

(75) Inventors: Kohei Kato, Kariya (JP); Fumitoshi Akaike, Nissin (JP); Seiya Nishimura, Okazaki (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 96 days.

(21) Appl. No.: 12/423,339

(22) Filed: Apr. 14, 2009

(65) Prior Publication Data
US 2009/0302648 A1 Dec. 10, 2009

(30) Foreign Application Priority Data
Jun. 4, 2008 (JP) ................................ 2008-146592

(51) Int. Cl.
*A47C 7/62* (2006.01)

(52) U.S. Cl. .................................. 297/217.3; 297/217.2

(58) Field of Classification Search ............... 297/217.2, 297/217.3
See application file for complete search history.

(56) References Cited

U.S. PATENT DOCUMENTS

| | | | |
|---|---|---|---|
| 4,796,013 A * | 1/1989 | Yasuda et al. | 340/562 |
| 6,356,194 B1 * | 3/2002 | Fukui et al. | 340/561 |
| 7,135,983 B2 * | 11/2006 | Filippov et al. | 340/667 |
| 7,401,532 B2 * | 7/2008 | Wanami | 73/862.626 |
| 7,436,315 B2 | 10/2008 | Kamizono et al. | |
| 7,469,594 B2 * | 12/2008 | Jitsui et al. | 73/779 |
| 7,701,338 B2 * | 4/2010 | Kamizono et al. | 340/561 |
| 2003/0174063 A1 * | 9/2003 | Basir et al. | 340/667 |

FOREIGN PATENT DOCUMENTS
JP 2006-292631 10/2006

OTHER PUBLICATIONS
U.S. Appl. No. 12/419,398 to Tanaka et al., which was filed on Apr. 7, 2009.
English language Abstract of JP 2006-292631.

* cited by examiner

*Primary Examiner* — Sarah B McPartlin
(74) *Attorney, Agent, or Firm* — Greenblum & Bernstein, P.L.C.

(57) ABSTRACT

A vehicle seat includes a cushion frame having conductivity; a cushion pad coveringly mounted on the cushion frame; and a cushion cover configured to cover the cushion pad. First thread members having conductive fibers are interwoven into the cushion cover. A capacitance measurer is provided to the vehicle seat to measure capacitance between the cushion frame and the conductive fibers.

11 Claims, 4 Drawing Sheets

VEHICLE SEAT

CROSS-REFERENCE TO RELATED APPLICATIONS

The present application claims priority under 35 U.S.C. §119 of Japanese Application No. 2008-146592 filed on Jun. 4, 2008, the disclosure of which is expressly incorporated by reference herein in its entirety.

BACKGROUND OF THE INVENTION

1. Field of the Invention

The present invention relates to a vehicle seat, particularly to a vehicle seat capable of determining whether or not an occupant is seated by measuring electrostatic capacitance.

2. Description of Related Art

As a vehicle seat of this type, technology disclosed in Related Art 1, for example, is already known. In the technology, capacitance is measured between electrodes, which are provided in a seat cushion, and a vehicle ground line (body earth line). Based on the measurement, the technology determines whether or not an occupant is seated. Thereby, in case of a vehicle crash, for example, an airbag for a vehicle seat with no occupant seated can be controlled not to deploy.

[Related Art 1] Japanese Patent Laid-open Publication No. 2006-292631

Since the vehicle seat above is provided with the electrodes inside the seat cushion, however, the internal structure of the seat cushion is complicated.

SUMMARY OF THE INVENTION

The present invention is provided to address the problem above. An advantage of an embodiment of the present invention is to provide a vehicle seat including a seat cushion having a simple structure, the vehicle seat being capable of determining whether or not an occupant is seated.

In order to attain such an advantage, the present invention has a structure described below. A first aspect of the present invention provides a vehicle seat including a seat cushion that includes a cushion frame having conductivity; a cushion pad coveringly mounted on the cushion frame; and a cushion cover configured to cover the cushion pad. First thread members including conductive fibers are interwoven into the cushion cover. A capacitance measurer is provided to measure capacitance between the cushion frame and the conductive fibers. In the structure above, the first thread members including the conductive fibers are interwoven into the cushion cover, and thus the seat cushion can have a simple structure. Further, even the seat cushion having the simple structure can determine whether or not an occupant is seated on the vehicle seat by measuring the capacitance.

A second aspect of the present invention provides the vehicle seat according to the first aspect, wherein the first thread members are interwoven in one direction. In the structure, the first thread members are interwoven in a lateral direction, and thus the cushion cover can be produced easily.

A third aspect of the present invention provides a vehicle seat including a seat cushion that includes a cushion pad coveringly mounted on a cushion frame; and a cushion cover configured to cover the cushion pad. A seating surface of the seat cushion is mainly divided into a first seating surface and second seating surfaces provided on both sides of the first seating surface. First thread members including conductive fibers are interwoven into the cushion cover of the first seating surface. Second thread members including conductive fibers are interwoven into the cushion cover of at least one of the second seating surfaces. A capacitance measurer is provided to measure capacitance between the conductive fibers of the both thread members. In the structure above, the first thread members including the conductive fibers and the second thread members including the conductive fibers are respectively interwoven into the cushion cover, and thus the seat cushion can have a simple structure according to the third aspect, similar to the first aspect. Further, even the seat cushion having the simple structure can determine whether or not an occupant is seated on the vehicle seat by measuring the capacitance.

A fourth aspect of the present invention provides the vehicle seat according to the third aspect, wherein the first thread members and the second thread members are respectively interwoven in one direction. In the structure, the first thread members and the second thread members are respectively interwoven in a lateral direction, and thus the cushion cover can be produced easily according to the fourth aspect, similar to the second aspect.

A fifth aspect of the present invention provides the vehicle seat according to the third aspect, wherein the first seating surface is a flat top panel main portion on which an occupant can be seated; and the second seating surfaces are a pair of left and right elevated support portions which can support both sides of the occupant seated on the top panel main portion. In the structure above, the first seating surface is the flat top panel main portion on which an occupant can be seated, and the second seating surfaces are the pair of left and right elevated support portions which can support the occupant seated on the top panel main portion from the both sides. Interweaving the first thread members into the top panel main portion and the second thread members into the support portions thus ensures determination whether or not an occupant is seated on the seat cushion.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

The embodiments of the present invention are explained below with reference to the drawings.

First Embodiment

Figure 1:
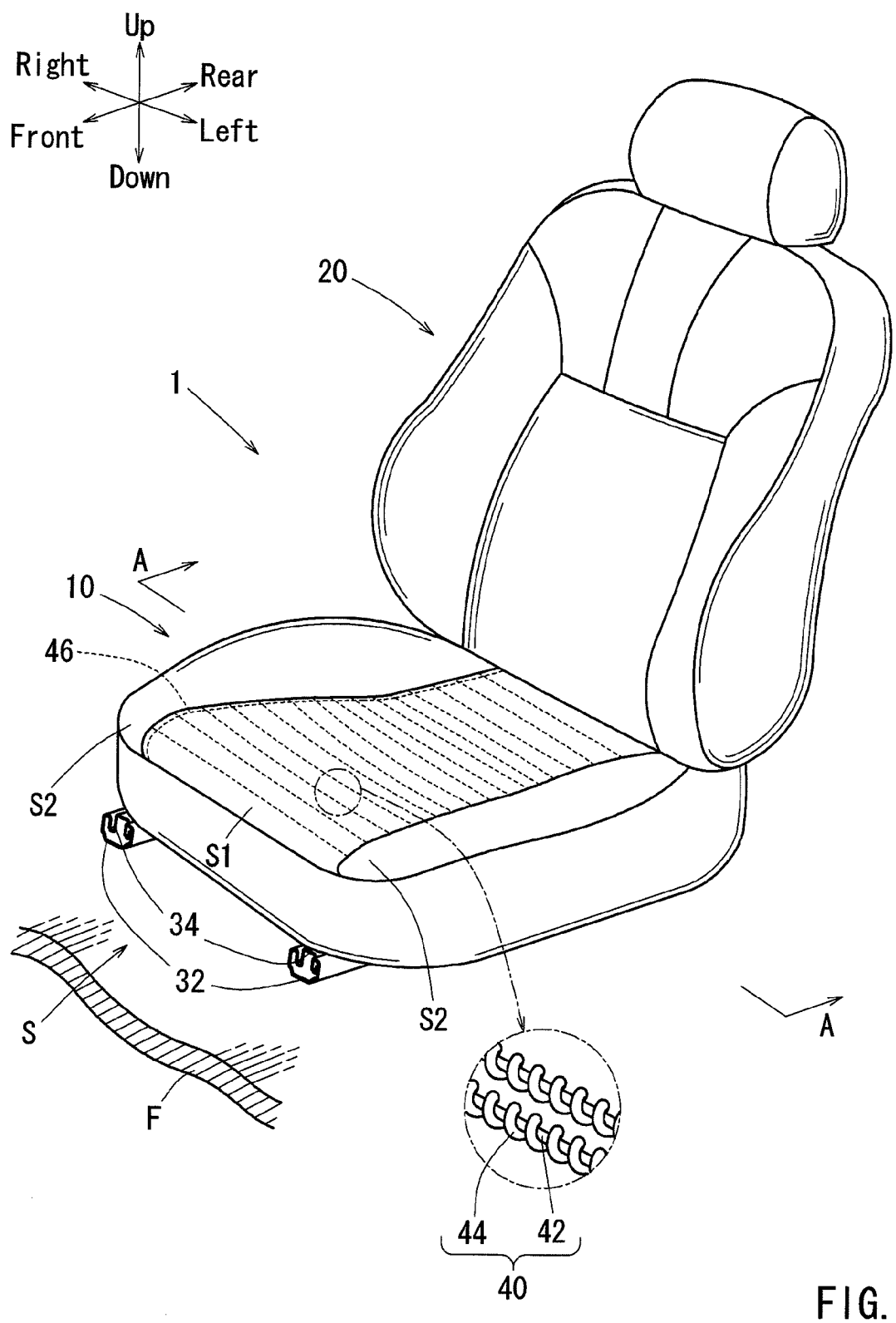
FIG. 1 is an overall perspective view of a vehicle seat according to a first embodiment of the present invention.
Figure 2:
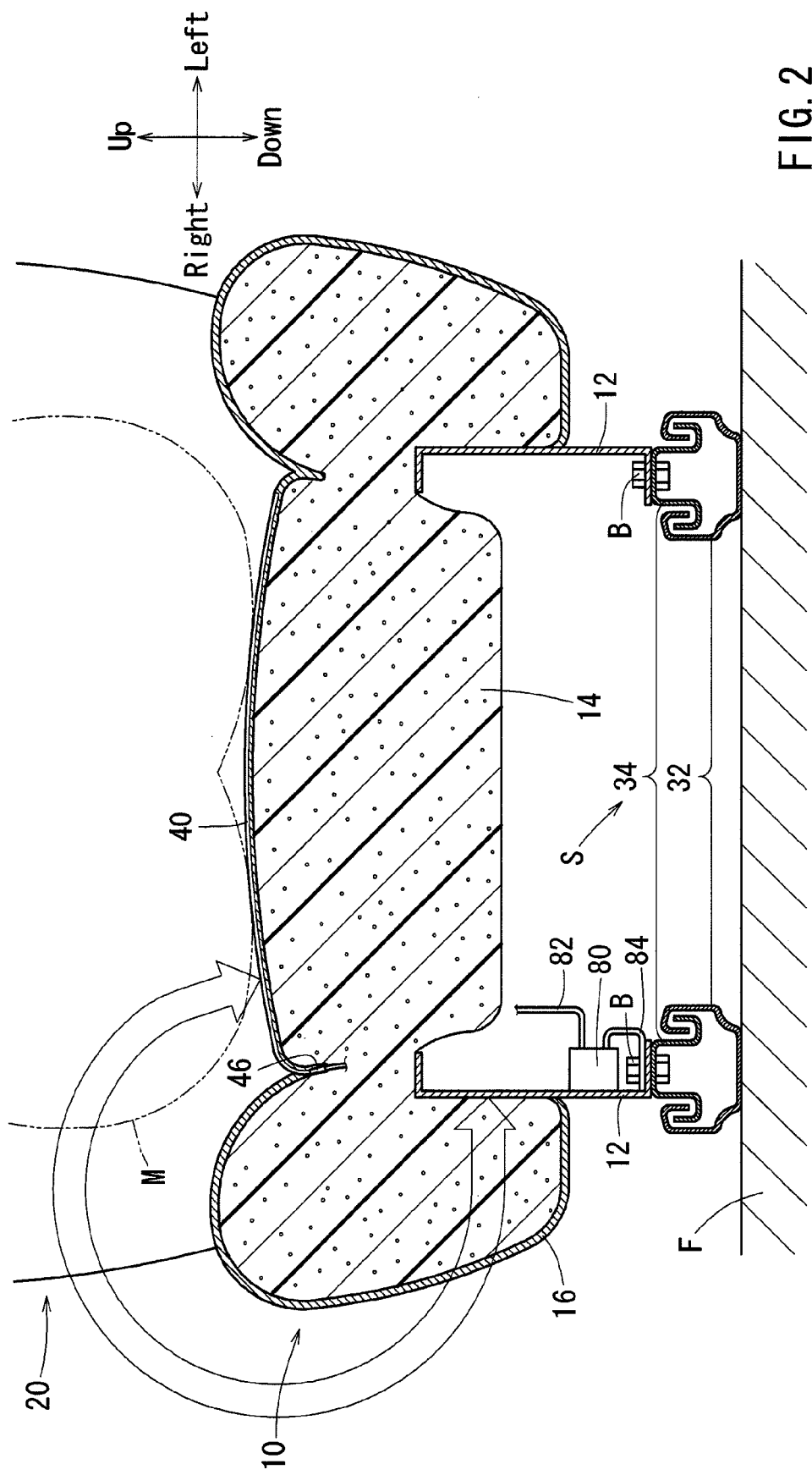
FIG. 2 is a cross-sectional view of the vehicle seat along line A-A in FIG. 1.

The first embodiment is first explained with reference to FIGS. 1 and 2. FIG. 1 is an overall perspective view of a vehicle seat according to the first embodiment of the present invention. FIG. 2 is a cross-sectional view of the vehicle seat along line A-A in FIG. 1. In the explanation below, "up," "down," "front," "rear," "left," and "right" indicate up, down, front, rear, left, and right directions shown in FIGS. 1 and 2; namely, up, down, front, rear, left, and right directions from a vehicle seat 1 as a reference point.

A structure of the vehicle seat 1 according to the first embodiment is first explained. The vehicle seat 1 includes a seat cushion 10 and a seat back 20, which is mounted to a rear end portion of the seat cushion 10 (Refer to FIG. 1). Since the seat back 20, which is one of the components 10 and 20, has a known structure, only the structure of the seat cushion 10 is explained in detail.

The seat cushion 10 includes a cushion frame 12, a cushion pad 14, and a cushion cover 16. The cushion frame 12 provides a frame of the seat cushion 10 and has conductivity (formed from steel, aluminum, and the like, for example). The cushion pad 14 is coveringly mounted on the cushion frame 12. The cushion cover 16 covers the cushion pad 14.

A seating surface of the seat cushion 10 is mainly divided into a first seating surface S1 and second seating surfaces S2. The first seating surface 1 is a flat top panel main portion on which an occupant M can be seated. The second seating surfaces S2 are a pair of left and right elevated support portions which support the occupant M seated on the first seating surface S1 from both sides. Specifically, of the seating surface of the seat cushion 10, a central recess is the first seating surface S1; and elevated portions on both sides of the recess are the pair of left and right second seating surfaces S2.

The cushion cover 16 in the first seating surface S1 is interwoven with a plurality of first thread members 40 in a lateral direction. More specifically, the first thread members 40 include conductive fibers (e.g., stainless steel fibers) 42 and nonconductive materials (e.g., covering twisted yarns) 44, which wrap around the conductive fibers 42 (Refer to a partially enlarged view in FIG. 1).

The conductive fibers 42 of the plurality of first thread members 40 are electrically connected to each other at a right end via a shorting member 46. The shorting member 46 is provided in a groove along a boundary between the first seating surface S1 and one of the second seating surfaces S2. Thereby, the shorting member 46 is provided without adversely affecting appearance of the seat cushion 10.

The cushion frame 12 is fastened to a vehicle floor F at left and right portions of a bottom surface via a known sliding mechanism S. The sliding mechanism S includes a pair of left and right lower rails 32 and left and right upper rails 34 slidable along the lower rails 32. Thereby, the seat cushion 10 (vehicle seat 1) is slidable forward and backward relative to the vehicle floor F.

Further, the cushion frame 12 is installed with a known capacitance detector 80 (Refer to FIG. 2). Two cables 82 and 84 are connected to the capacitance detector 80. Of the two cables 82 and 84, the cable 82 is connected to the shorting member 46; and the cable 84 is fastened to a bolt B, which also fastens the cushion frame 12 and one of the upper rails 34. Thus, the capacitance can be measured between the cushion frame 12 and the conductivity fibers 42 of the first thread members 40 (See an arrow in FIG. 2).

Functions of the vehicle seat 1 according to the first embodiment are described below. Four comparative examples (a first comparative example to a fourth comparative example) below in which the capacitance is measured respectively, are explained to describe the functions.

The first comparative example is a case when no occupant M is seated on the vehicle seat 1. The second comparative example is a case when a car seat on which a child is seated is placed on the vehicle seat 1. The third comparative example is a case when an occupant M of AF05 (an American woman falling in a 0% to 5% range on a small to large scale of types of physique) is seated on the vehicle seat 1. The fourth comparative example is a case when an occupant M of JM50 (a Japanese man falling in a 25% to 50% range on a small to large scale of types of physique) is seated on the vehicle seat 1.

When the capacitance is measured in the four comparative examples, results are "60" pF, "60" pF, "120" pF, and "160" pF in the order. Thus, the four comparative examples can be mainly categorized into two groups: a first group consisting of the first comparative example and the second comparative example, and a second group consisting of the third comparative example and the fourth comparative example. When a case is categorized into the first group, it is determined that no occupant M is seated on the vehicle seat 1. Meanwhile, when a case is categorized into the second group, it is determined that an occupant M is seated on the vehicle seat 1. Thereby, whether or not the occupant M is seated can be determined.

The vehicle seat 1 according to the first embodiment has a structure as described above, in which the first thread members 40 including the conductive fibers 42 are interwoven into the cushion cover 16. Thus, the seat cushion 10 can have a simple structure. Even the seat cushion 10 having the simple structure can determine whether or not an occupant is seated on the vehicle seat 1 by measuring the capacitance.

In addition, since the first thread members 40 are interwoven in the lateral direction in the structure, the cushion cover 16 can be produced easily.

Second Embodiment

Figure 3:
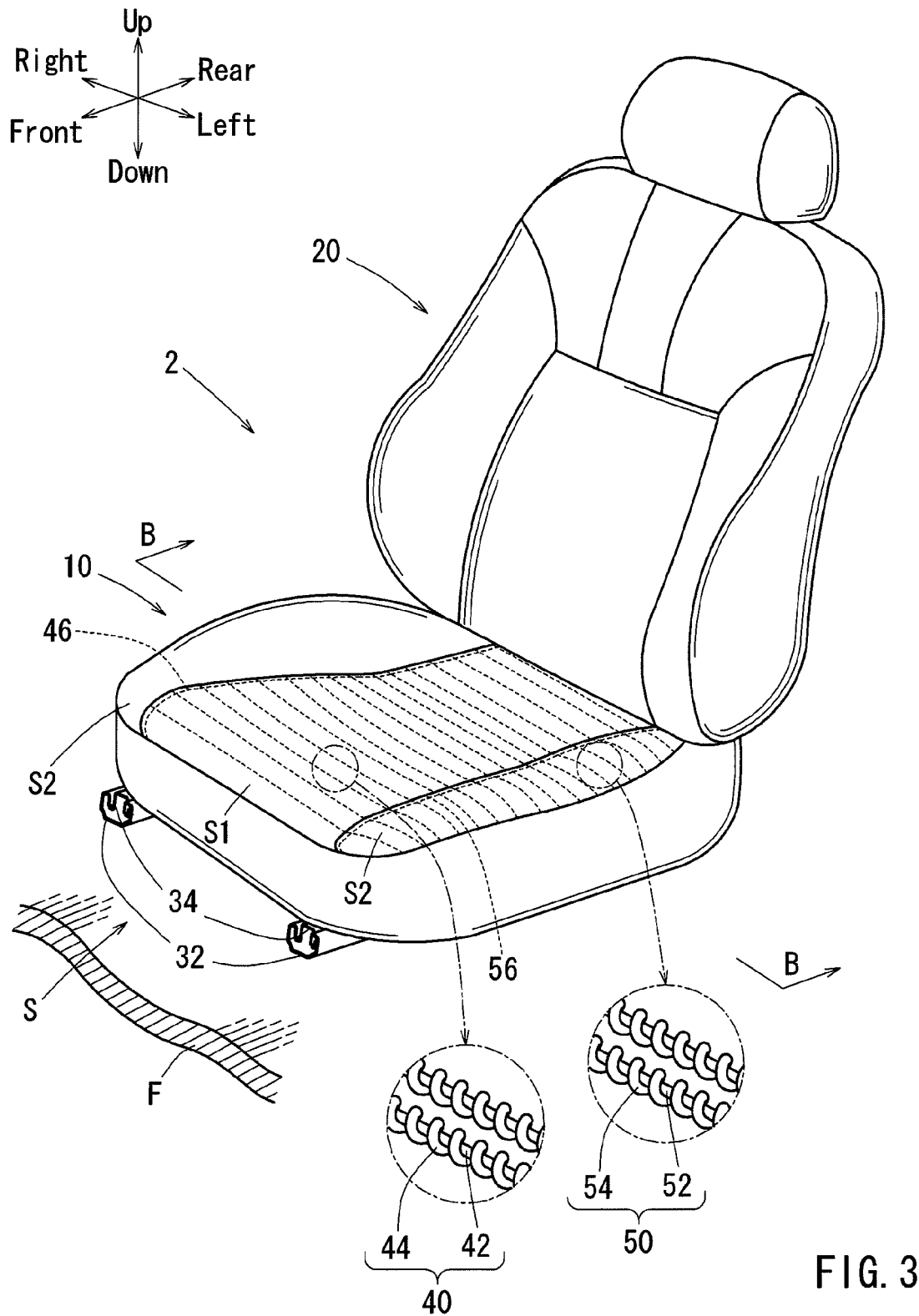
FIG. 3 is an overall perspective view of a vehicle seat according to a second embodiment of the present invention.
Figure 4:
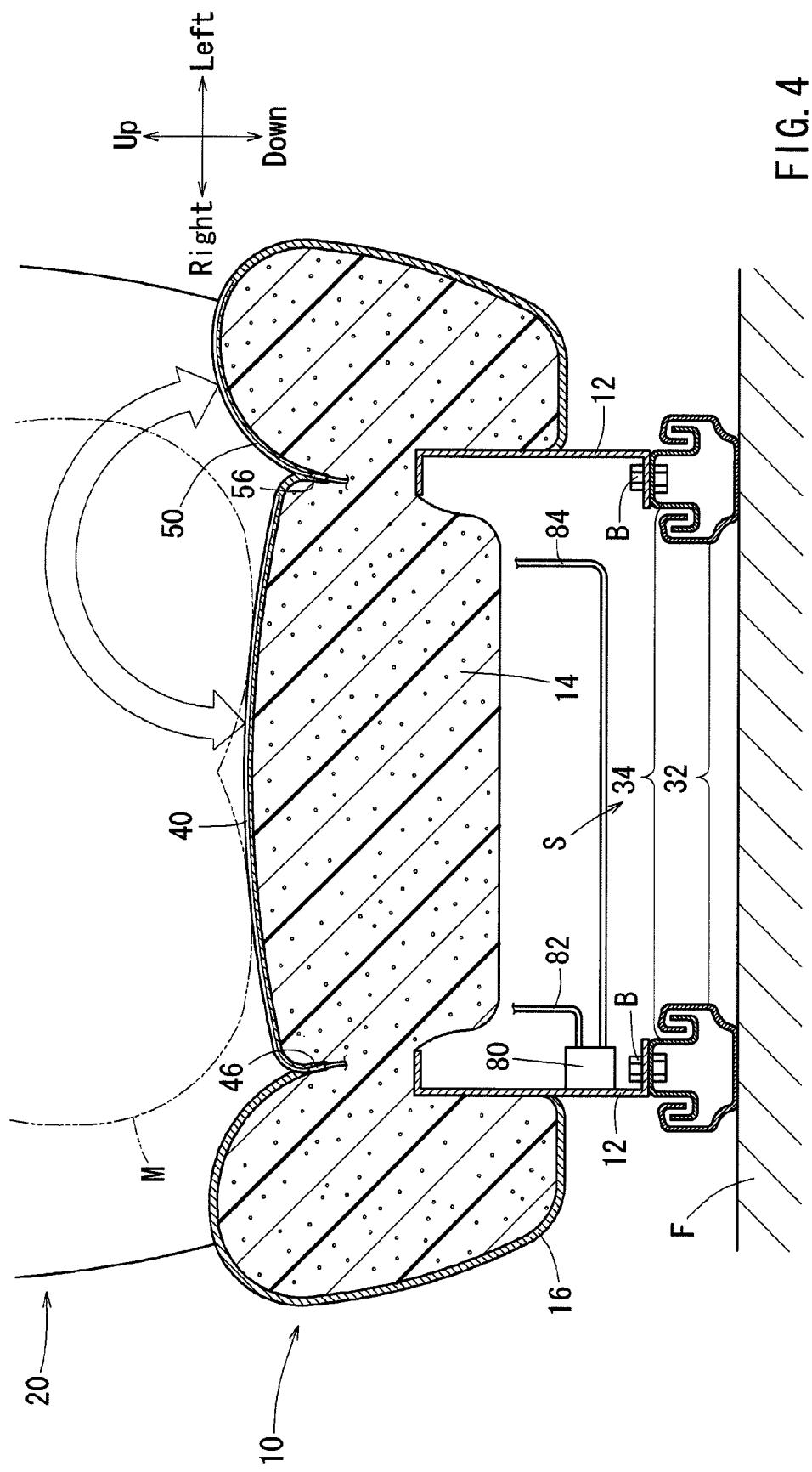
FIG. 4 is a cross-sectional view of the vehicle seat along line B-B in FIG. 3.

The second embodiment is explained below with reference to FIGS. 3 and 4. FIG. 3 is an overall perspective view of a vehicle seat according to the second embodiment of the present invention. FIG. 4 is a cross-sectional view of the vehicle seat along line B-B in FIG. 3. In the explanation below, components identical or equivalent to those in the first embodiment are provided with identical reference numerals and are not explained repeatedly.

A structure of a vehicle seat 2 according to the second embodiment is first explained. Compared to the vehicle seat 1 of the first embodiment explained above, the cushion cover 16 of the vehicle seat 2 has a different structure. Specifically, the cushion cover 16 of the vehicle seat 1 of the first embodiment has the plurality of first thread members 40 laterally interwoven only in the first seating surface S1. In contrast, the cushion cover 16 of the vehicle seat 2 of the second embodiment described hereinafter, does not only have the plurality of first thread members 40 laterally interwoven in the first seating surface S1, but also has a plurality of second thread members 50 laterally interwoven in the left side second seating surface S2.

Similar to the first thread members 40 explained in the first embodiment, the second thread members 50 include conductive fibers (e.g., stainless steel fibers) 52 and nonconductive materials (e.g., covering twisted yarns) 54, which wrap around the conductive fibers 52 (Refer to a partially enlarged view in FIG. 3). The conductive fibers 52 of the plurality of second thread members 50 are electrically connected to each other at a right side via a shorting member 56, which is similar to the shorting member 46 explained in the first embodiment. The shorting member 56 is also provided in a groove along a boundary between the first seating surface S1 and the left side second seating surfaces S2. Thereby, the shorting member 56 is provided without adversely affecting appearance of the seat cushion 10.

Of the two cables 82 and 84 connected to the capacitance detector 80, the cable 84 is connected to the shorting member 56, without being fastened to a bolt B (Refer to FIG. 4). Thus, the capacitance can be measured between the conductivity fibers 42 of the first thread members 40 and the conductivity fibers 52 of the second thread members 50 (See an arrow in FIG. 4).

The vehicle seat 2 according to the second embodiment has a structure as described above, in which the first thread members 40 including the conductive fibers 42 and the second thread members 50 including the conductive fibers 52 are respectively interwoven into the cushion cover 16. Thus, the seat cushion 10 according to the second embodiment can have a simple structure, similar to the first embodiment. Even the seat cushion 10 having the simple structure can determine whether or not an occupant is seated on the vehicle seat 2 by measuring the capacitance.

In addition, since the first thread members 40 and the second thread members 50 are interwoven in the lateral direction in the structure, the cushion cover 16 can be produced easily, similar to the first embodiment.

Further, in the structure, the first seating surface S1 is a flat top panel main portion on which an occupant can be seated; the second seating surfaces S2 are a pair of left and right elevated support portions which support the occupant seated on the top panel main portion from both sides. Since the first thread members 40 are interwoven into the top panel main portion, and the second thread members 50 are interwoven into the support portions, the structure surely determines whether or not an occupant is seated on the seat cushion 10.

The explanation above merely pertains to exemplary embodiments of the present invention, and is not construed as limitation of the present invention to the above explanation. In the first embodiment, a case was explained where the plurality of first thread members 40 are interwoven in the lateral direction. The present invention, however, is not limited to the embodiment, and the plurality of first thread members 40 may be interwoven in a longitudinal direction, for example. The weaving direction may be applied to the second thread members 50 explained in the second embodiment.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A vehicle seat including a seat cushion, comprising:
   a cushion frame having conductivity;
   a cushion pad coveringly mounted on the cushion frame; and
   a cushion cover configured to cover the cushion pad, the cushion cover including at least an outermost layer that defines an exposed surface of the vehicle seat,
   wherein conductive fibers are interwoven into and wrapped about by non-conductive materials of the outermost layer of the cushion cover; and
   wherein a capacitance measurer is provided to measure a capacitance between the cushion frame and the conductive fibers.

2. The vehicle seat according to claim 1, wherein the conductive fibers are interwoven in one direction.

3. The vehicle seat according to claim 1, wherein the plurality of nonconductive materials are helically wrapped about the conductive fibers.

4. The vehicle seat according to claim 1, wherein the outermost layer of the cushion cover consists essentially of the conductive fibers and the plurality of nonconductive materials.

5. The vehicle seat according to claim 1, wherein the exposed surface of the cushion cover is generally planar.

6. The vehicle seat according to claim 1, wherein the exposed surface of the cushion cover defines a seating surface of the vehicle seat.

7. The vehicle seat according to claim 1, wherein the conductive fibers are visible from the exposed surface of the vehicle seat.

8. The vehicle seat according to claim 1, wherein the conductive fibers extend parallelly in a first direction.

9. The vehicle seat according to claim 8, wherein the first direction is parallel to a front of the vehicle seat.

10. The vehicle seat according to claim 8, further comprising:
    a shorting wire that extends in a second direction perpendicular to the first direction,
    wherein each of the conductive fibers is electrically interconnected with the shorting wire.

11. The vehicle seat according to claim 10, wherein the first direction is parallel to a front of the vehicle seat and the second direction is perpendicular to the front of the vehicle seat.

* * * * *